United States Patent

Harada et al.

[11] Patent Number: 5,817,586
[45] Date of Patent: Oct. 6, 1998

[54] COLORED CERAMIC COMPOSITION

[75] Inventors: Kazuo Harada; Hiroshi Usui; Tsuneo Manabe, all of Yokohama, Japan

[73] Assignee: Asahi Glass Company Ltd., Tokyo, Japan

[21] Appl. No.: 837,334

[22] Filed: Apr. 11, 1997

[30] Foreign Application Priority Data

Apr. 12, 1996 [JP] Japan ................................. 8-091114

[51] Int. Cl.$^6$ ................................. C03C 8/04; C03C 8/14
[52] U.S. Cl. ................................. 501/17; 501/5; 501/25; 501/26; 501/32; 427/37.4
[58] Field of Search ................................. 501/17, 26, 32, 501/25, 5; 427/374.7

[56] References Cited

U.S. PATENT DOCUMENTS

| | | |
|---|---|---|
| 4,970,178 | 11/1990 | Klimas et al. . |
| 5,208,191 | 5/1993 | Ruderer et al. ............................. 501/17 |
| 5,252,521 | 10/1993 | Roberts . |
| 5,342,810 | 8/1994 | Merigaud et al. . |
| 5,547,749 | 8/1996 | Chiba et al. ............................. 501/32 |
| 5,578,533 | 11/1996 | Manabe et al. ............................. 501/17 |
| 5,618,764 | 4/1997 | Usui et al. . |

FOREIGN PATENT DOCUMENTS

| | | |
|---|---|---|
| 56-5348 | 1/1981 | Japan . |
| 56-5349 | 1/1981 | Japan . |
| 60-186438 | 9/1985 | Japan . |
| 2-102147 | 4/1990 | Japan . |
| 6-191844 | 7/1994 | Japan . |

*Primary Examiner*—Karl Group
*Attorney, Agent, or Firm*—Oblon, Spivak, McClelland, Maier & Neustadt, P.C.

[57] ABSTRACT

A colored ceramic composition comprising, as inorganic components, from 5 to 40 wt % of a colored heat resistant pigment powder, from 60 to 95 wt % of a powder of zinc-containing glass and from 0 to 10 wt % of a refractory filler powder, wherein said glass consists essentially of the following components:

| | |
|---|---|
| $SiO_2$ | 30 to 60 wt % |
| ZnO | 8 to 60 wt % |
| $B_2O_3$ | 0 to 5 wt % |
| $Li_2O$ | 0 to 20 wt % |
| $Na_2O$ | 0 to 20 wt % |
| $K_2O$ | 0 to 20 wt % |
| $Li_2O + Na_2O + K_2O$ | 0.1 to 20 wt % |
| MgO + CaO + SrO + BaO | 0 to 20 wt % |
| $Bi_2O_3$ | 0 to 40 wt % |
| $TiO_2$ | 0 to 10 wt % |
| F | 0 to 5 wt %. |

10 Claims, No Drawings

COLORED CERAMIC COMPOSITION

BACKGROUND OF THE INVENTION

Field of the Invention

The present invention relates to a colored ceramic composition which does not contain lead or cadmium and which contains zinc. Particularly, it relates to a colored ceramic composition excellent in acid resistance.

Discussion of Background

As a typical application of a colored ceramic composition, an application to a window glass for an automobile may be mentioned. This is designed so that a colored ceramic composition in the form of a paste is screen-printed along the peripheral portion or at the center portion of a window glass of an automobile, then dried and baked in a step of heating the glass plate for bending. Such a composition is widely used as a colored ceramic paste for automobiles.

When baked along the peripheral portion of the window glass, this colored ceramic paste will form a colored opaque layer, which is useful for the purpose of preventing deterioration of a urethane sealant by ultraviolet rays or preventing e.g. terminals of heating wires from being seen through from outside the automobile.

Known as a composition of this type is one having various heat-resistant coloring pigments mixed to a low melting point glass powder. As such a low melting point glass, it has been common to use one containing lead, cadmium, etc., and such a glass is known (e.g. JP-A-1-160845).

On the other hand, a glass powder which does not contain lead or cadmium and which contains zinc as a fluxing agent, is also known (JP-A-56-5348, JP-A-56-5349, JP-A-60-186438, JP-A-2-102147, U.S. Pat. No. 5,342,810, JP-A-6-191844, U.S. Pat. No. 5,252,521 and U.S. Pat. No. 4,970, 178).

However, a colored ceramic composition employing such a glass powder does not have adequate acid resistance. Accordingly, the colored ceramic composition which is formed into a paste and baked to a glass plate, is likely to be eroded by an acid, and there has been a concern that the color of the colored ceramic layer may change or the layer may peel, due to an influence of e.g. acidic rain water. Thus, it has been difficult to practically use such a composition on an industrial scale.

SUMMARY OF THE INVENTION

It is an object of the present invention to solve such problems of the prior art and to present a colored ceramic composition which does not contain lead or cadmium and which is excellent in acid resistance.

The present invention provides a colored ceramic composition comprising, as inorganic components, from 5 to 40 wt % of a colored heat resistant pigment powder, from 60 to 95 wt % of a powder of zinc-containing glass and from 0 to 10 wt % of a refractory filler powder, wherein said glass consists essentially of the following components:

| | |
|---|---|
| $SiO_2$ | 30 to 60 wt % |
| ZnO | 8 to 60 wt % |
| $B_2O_3$ | 0 to 5 wt % |
| $Li_2O$ | 0 to 20 wt % |
| $Na_2O$ | 0 to 20 wt % |
| $K_2O$ | 0 to 20 wt % |
| $Li_2O + Na_2O + K_2O$ | 0.1 to 20 wt % |
| $MgO + CaO + SrO + BaO$ | 0 to 20 wt % |
| $Bi_2O_3$ | 0 to 40 wt % |
| $TiO_2$ | 0 to 10 wt % |
| F | 0 to 5 wt %. |

DETAILED DESCRIPTION OF THE PREFERRED EMBODIMENTS

The reasons for defining the composition of the glass are as follows.

$SiO_2$ is a network former of glass, and it is necessary also for improving chemical resistance and heat resistance. If its content is less than 30 wt %, vitrification may sometimes tend to be difficult, and if its content exceeds 60 wt %, the softening point of glass tends to be too high, and, for example, baking tends to be difficult at a bending temperature of a glass plate for an automobile as a common application of the colored ceramic composition. The content of $SiO_2$ is preferably from 32 to 50 wt % within the above range.

ZnO serves as a flux and is necessary also for improving the melting property of glass. If its content is less than 8 wt %, the fluidity of glass at a high temperature tends to be low, and baking to a glass plate at a temperature for bending the glass plate tends to be difficult, and if its content exceeds 60 wt %, vitrification tends to be difficult. The content of ZnO is preferably from 9 to 45 wt % within the above range.

$B_2O_3$ is not essential, but serves as a flux, and it may be incorporated also for improving the melting property of glass. However, if it is incorporated beyond 5 wt %, the acid resistance tends to be remarkably low.

The incorporation of $B_2O_3$ is effective also for slowing down the speed of crystallization during baking to obtain a dense colored ceramic layer. For this purpose, it is preferably incorporated in an amount of at least 0.1 wt %, more preferably at least 0.5 wt %.

$Na_2O$, $K_2O$ and $Li_2O$ (hereinafter represented by $R_2O$) are used as fluxing agents. In the glass of the present invention, they are incorporated in a total amount of at least 0.1 wt %. If the total amount exceeds 20 wt %, the acid resistance is likely to deteriorate. Further, each of them is at most 20 wt %. $R_2O$ is preferably from 5 to 15 wt % in the total amount. Further, each of them is preferably from 0.1 to 15 wt %, more preferably from 0.1 to 10 wt %.

In the glass of the present invention, addition of $Li_2O$ substantially influences the crystallization behavior, which in turn influences the acid resistance. Namely, $Li_2O$ has an effect for promoting precipitation of lithium zinc silicate crystals by heat treatment within the range of the glass composition of the present invention, and precipitation of such crystals is attributable to improvement in the acid resistance of the colored ceramic composition. Further, by the amount of $Li_2O$ to be added, the precipitation temperature and the precipitation amount of crystals can be controlled.

From such a viewpoint, $R_2O$ preferably comprises at least two members including $Li_2O$, and their proportions may be suitably determined depending upon the required acid resistance, thermal expansion coefficient and baking temperature. $Li_2O$ is preferably from 0.3 to 5 wt % within the above range.

Further, alkaline earth metal oxides MgO, CaO, SrO and BaO (hereinafter represented by RO) are not essential, but may be incorporated to adjust the sintering properties, acid resistance and thermal expansion coefficient. Especially, if the difference in the thermal expansion coefficient between the colored ceramic composition and the substrate to which the composition is baked, is small, the strength of such a composite product increases. Therefore, the type and the amount of RO are suitably selected depending upon the type of the substrate. For example, when the substrate is soda lime silicate glass, it is effective to incorporate MgO. The total amount of these oxides is at most 20 wt %. If the total amount exceeds 20 wt %, the softening point and the thermal expansion coefficient tend to be too high, whereby the sintering properties of the composition and the strength of the composite product comprising the composition and the substrate may deteriorate. Preferably, the total amount is at most 10 wt %.

$Bi_2O_3$ is not essential, but serves as a flux, and it may be incorporated also for improving the melting property of glass. Further, it improves the fluidity of the obtained glass powder at a high temperature, and thus has an effect for improving the adhesion between the colored ceramic paste and the substrate. From this viewpoint, the content of $Bi_2O_3$ is preferably at least 1 wt %, more preferably at least 5 wt %. From the viewpoint of reduction of costs and improvement of acid resistance, its content is at most 40 wt %, preferably at most 30 wt %.

$TiO_2$ is not essential, but serves as a nuclei-forming agent for crystallization of the glass powder, and it may accordingly be incorporated to control the crystallizability. However, in order not to impair the sintering properties or acid resistance, its content is usually at most 10 wt %, preferably at most 5 wt %.

Further, F may be incorporated, although it is not essential. F serves to lower the softening point and to increase the fluidity at a high temperature, and it accordingly has an effect for improving the sintering properties. In order not to impair the acid resistance, its content is usually at most 5 wt %.

In addition to the above components, other components such as $Al_2O_3$, $La_2O_3$, $ZrO_2$, $SnO_2$ and $P_2O_5$ may suitably be incorporated to adjust the sintering temperature, the thermal expansion coefficient or the like, within a range of at most 10 wt %, preferably at most 5 wt % not to impair the uniformity of glass.

Now, the construction of the colored ceramic composition of the present invention will be described.

If the content of the glass powder is less than 60 wt %, baking to a glass plate at a temperature for bending the glass plate tends to be difficult, and if it exceeds 95 wt %, the content of the colored heat resistant pigment powder tends to be relatively small, whereby the desired concentration can not be obtained.

On the other hand, if the content of the colored heat resistant pigment powder is less than 5 wt %, the desired concentration can not be obtained, and if it exceeds 40 wt %, the amount of the glass tends to be relatively small, whereby baking to a glass plate at a temperature for bending the glass plate tends to be difficult. Preferably, it is from 10 to 38 wt %. Such a colored heat resistant pigment may, for example, be the one composed mainly of an oxide of iron and manganese, the one composed mainly of an oxide of copper and chromium, or the one composed mainly of an oxide of cobalt and chromium.

The refractory filler powder is not essential. However, by incorporating this refractory filler powder in an amount of at most 10 wt %, it is possible to control the thermal expansion coefficient and the fluidity. If the content of the refractory filler powder exceeds 10 wt %, the glass content tends to be too small, and baking to the glass plate at a temperature for bending the glass plate tends to be difficult. Such a refractory filler may, for example, be $\alpha$-alumina, $\alpha$-quartz, zircon, cordierite, forsterite or bismuth titanate.

When the colored ceramic composition of the present invention is to be used for a window glass for a vehicle, the glass powder is preferably a crystalline glass which precipitates crystals in a temperature range of from 500° to 700° C. If crystals precipitate during the bending operation, the apparent viscosity becomes high, whereby adhesion of the colored ceramic composition to the press die can be prevented. Here, the crystalline glass is meant for a glass which is in a vitrified state at room temperature and which precipitates crystals by heat treatment at a temperature of from 500° to 700° C. for 10 minutes. From such a viewpoint, it is preferred to incorporate $Li_2O$ as a component of the glass powder in the present invention and thus to precipitate crystals of zinc lithium silicate at the time of baking, as mentioned above.

For a window glass for vehicles, it is preferred to adjust the sintering temperature, the crystallization temperature, the thermal expansion coefficient, etc. of the composition so that they are suitable for baking to a soda lime silica glass plate having a composition comprising from 68 to 74 wt % of $SiO_2$, from 0.5 to 2 wt % of $Al_2O_3$, from 7 to 12 wt % of CaO, from 2 to 5 wt % of MgO and from 9 to 15 wt % of $Na_2O$, i.e. a glass plate commonly used for windows.

Namely, the glass transition temperature of the glass to be used in the present invention is preferably at most 550° C. And the transition temperature is preferably at least 400° C., so that baking can be carried out in a temperature range for bending a glass plate.

Further, the average thermal expansion coefficient within a range of from 50° to 350° C. is preferably from $65 \times 10^{-7}$° to $100 \times 10^{-7}$/° C., more preferably from $70 \times 10^{-7}$° to $95 \times 10^{-7}$/° C.

Further, if the crystallization temperature of the glass powder is adjusted so that it will be within a temperature range for bending a soda lime silicate glass plate which is a window glass for vehicles, a part of the glass powder will be crystallized during the heat bending operation of the glass plate, whereby the apparent viscosity will be high, and it is thereby possible to avoid adhesion of the colored ceramic composition to the pressing die.

The weight average particle size of each of the above materials is preferably within a range of from 0.1 to 10 $\mu$m. If the weight average particle size is less than 0.1 $\mu$m, the productivity tends to be substantially poor, and the product will be expensive. On the other hand, if it exceeds 10 $\mu$m, the paste tends to have poor screen printability. More preferably, it is from 1 to 6 $\mu$m.

The ceramic composition of the present invention will be used as follows. Firstly, an organic vehicle is incorporated to such a ceramic color composition to form a paste. The organic vehicle may be the one prepared by dissolving a polymer which is commonly used, such as ethyl cellulose, an acrylic resin, a styrene resin, a phenol resin or butyral, in a solvent such as $\alpha$-terpineol, butyl carbitol acetate or a phthalic acid ester.

Then, the paste of the colored ceramic composition is coated by a coating means such as screen printing on a desired portion on the surface of a substrate (usually a glass plate such as a soda lime silica glass plate) on which a coating film is to be formed. The portion to be coated is, for example, a peripheral portion of a windshield glass, a side glass or a rear glass, in the case of glass plates for automobiles.

Then, if necessary, a layer of a silver paste is overcoated on at least a part of the colored ceramic layer. The substrate having such a colored ceramic composition coated thereon, is then dried and then introduced into and heated in a heating furnace. Here, the heating temperature is usually from 500° to 620° C., and at this temperature, the colored ceramic composition and the silver paste, if coated, will fuse to the substrate. Then, the substrate is further maintained at a temperature of from 600° to 700° C., whereby the glass of the fused colored ceramic composition will preferably be crystallized, and the colored ceramic composition will be baked to the glass plate.

In the case of an application to a window glass for an automobile, the glass plate as the substrate will then be bent by a shaping apparatus such as a pressing apparatus or a vacuum adsorption shaping apparatus provided in the furnace, in accordance with a conventional method. Here, a stainless steel covered with a cloth of glass fibers, is usually employed as the die for the pressing apparatus or the vacuum adsorption shaping apparatus, and the glass plate is pressed via this cloth.

Now, the present invention will be described in further detail with reference to Examples. However, it should be understood that the present invention is by no means restricted by such specific Examples.

EXAMPLES 1 to 14

Starting materials were prepared and blended so as to obtain the glass composition (unit: wt %) as shown in the column for "glass composition" in Tables 1 and 2 and melted and vitrified at a temperature of from 1,300° to 1,400° C. to obtain a crystallizable glass. Then, this crystallizable glass was pulverized by a ball mill to obtain a glass powder having a weight average particle size of about 2.5 $\mu$m. The properties of this glass are shown in the columns for "glass transition temperature (°C.)", "thermal expansion coefficient ($\times 10^{-7}$/°C.)" and "weight reduction (%) in acid", in Tables 1 and 2. Here, the thermal expansion coefficient represents an average thermal expansion coefficient within a temperature range of from 50° to 350° C. after baking the glass powder, and the weight reduction in acid is obtained in such a manner that the glass powder is molded into a cylindrical shape having a diameter of 5 mm and a height of 30 mm and then baked at 650° C. for 10 minutes for sintering, and the sintered product is immersed in 1N sulfuric acid for 24 hours, whereupon the difference in weight between before and after the immersion is taken as the weight reduction. The weight reduction is preferably at most 10%, more preferably at most 5%. Then, this glass powder, a black heat resistant pigment powder (302A, manufactured by Nippon Ferro Corporation) and a filler (zircon) were mixed in the weight ratios as shown in the column for "paste composition" in Table 1 or 2.

Then, added to 80 parts by weight of this mixed powder was 20 parts by weight of an α-terpineol solution having 10 wt % ethyl cellulose dissolved therein, and the mixture was kneaded and uniformly dispersed by a three-roll mill to adjust the viscosity to a desired paste viscosity to obtain a paste of the colored ceramic composition. Examples 13 and 14 represent Comparative Examples outside the scope of the present invention.

The paste of the colored ceramic composition thus obtained, was screen-printed over the entire surface of a soda lime silica glass plate (thickness: 3.5 mm, size: 10 cm×10 cm) and then dried. The dried composition was baked at 650° C. The colored ceramic film after baking was analyzed by X-ray diffraction. In this manner, it was confirmed that in all Examples, crystals of lithium zinc silicate were formed.

Further, such a glass plate having a colored ceramic film was immersed in 0.1N sulfuric acid and maintained at 40° C. for 24 hours and then taken out, and the surface condition of the colored ceramic film was visually inspected to evaluate acid resistance. As evaluation standards, symbol ○ indicates a case where no change was observed in the color of the surface of the colored ceramic film as between before and after the test, and symbol x indicates a case where the color change of the surface of the colored ceramic film was substantial as between before and after the test, and peeling from the glass plate was observed.

As is evident from Tables 1 and 2, the colored ceramic compositions of the present invention are excellent in acid resistance.

TABLE 1

|  | 1 | 2 | 3 | 4 | 5 | 6 | 7 | 8 |
|---|---|---|---|---|---|---|---|---|
| Glass composition |  |  |  |  |  |  |  |  |
| $SiO_2$ | 34.3 | 38.3 | 33.9 | 33.7 | 33.9 | 41.9 | 34.6 | 33.5 |
| ZnO | 33.8 | 37.7 | 33.4 | 33.2 | 29.3 | 41.3 | 29.8 | 33.0 |
| $B_2O_3$ | — | 2.0 | — | — | — | — | — | — |
| $Li_2O$ | 2.5 | 2.8 | 1.2 | 0.6 | 2.5 | 0.8 | 1.3 | 1.2 |
| $Na_2O$ | 5.2 | 5.7 | 7.6 | 8.8 | 5.1 | 11.0 | 7.8 | 7.5 |
| $Bi_2O_3$ | 24.2 | 13.5 | 23.9 | 23.7 | 23.9 | — | 24.4 | 23.6 |
| MgO | — | — | — | — | — | — | 2.1 | — |
| SrO | — | — | — | — | 5.3 | — | — | — |
| $TiO_2$ | — | — | — | — | — | 5.1 | — | — |
| $P_2O_5$ | — | — | — | — | — | — | — | — |
| F | — | — | — | — | — | — | — | 1.2 |
| Glass transition temperature | 470 |  | 477 | 487 | 465 |  | 480 | 445 |
| Thermal expansion coefficient | 87 |  | 89 | 89 | 85 |  | 88 | 86 |
| Weight reduction in acid | 8.4 |  | 3.7 | 9.0 | 4.7 |  | 3.6 | 5.8 |

TABLE 1-continued

|  | 1 | 2 | 3 | 4 | 5 | 6 | 7 | 8 |
|---|---|---|---|---|---|---|---|---|
| Paste composition |  |  |  |  |  |  |  |  |
| Glass | 70 | 70 | 70 | 70 | 70 | 70 | 70 | 70 |
| Heat-resistant pigment | 30 | 30 | 30 | 30 | 30 | 30 | 30 | 30 |
| Acid resistance test | ◯ | ◯ | ◯ | ◯ | ◯ | ◯ | ◯ | ◯ |

TABLE 2

|  | 9 | 10 | 11 | 12 | 13 | 14 |
|---|---|---|---|---|---|---|
| Glass composition |  |  |  |  |  |  |
| $SiO_2$ | 32.3 | 32.3 | 33.4 | 41.0 | 36.6 | 34.7 |
| ZnO | 31.9 | 31.9 | 32.9 | 40.3 | 39.7 | 41.8 |
| $B_2O_3$ | 3.4 | 3.4 | 3.5 | 4.3 | 8.5 | 13.4 |
| $Li_2O$ | 1.2 | 1.2 | 1.2 | 2.2 | 6.0 | 3.3 |
| $Na_2O$ | 7.3 | 7.3 | 7.5 | 10.8 | 9.2 | 6.8 |
| $Bi_2O_3$ | 22.8 | 22.8 | 18.9 | — | — | — |
| MgO | — | — | — | — | — | — |
| SrO | — | — | — | — | — | — |
| $TiO_2$ | — | — | — | — | — | — |
| $P_2O_5$ | — | — | 1.4 | — | — | — |
| F | 1.1 | 1.1 | 1.2 | 1.4 | — | — |
| Glass transition temperature | 445 |  | 435 | 455 | 468 | 452 |
| Thermal expansion coefficient | 86 |  | 84 | 90 | 80 | 79 |
| Weight reduction in acid | 1.7 |  | 4.8 | 4.9 | 39 | 55 |
| Paste composition |  |  |  |  |  |  |
| Glass | 70 | 70 | 70 | 70 | 70 | 70 |
| Heat-resistant pigment | 30 | 25 | 30 | 30 | 30 | 30 |
| Filler | — | 5 | — | — | — | — |
| Acid resistance test | ◯ | ◯ | ◯ | ◯ | X | X |

The colored ceramic composition of the present invention contains ZnO and $SiO_2$ and is crystallizable at a temperature for shaping glass and excellent in acid resistance. Accordingly, it is capable of providing a curved glass plate useful for e.g. a window glass for vehicles, which is free from fusion to a pressing die during the press bending process of the glass plate and which is excellent in acid resistance and does not contain an environment-polluting substance such as lead.

The present invention is useful not only for a window glass for automobiles but also for articles to which such a colored ceramic composition can be baked. For example, it can be applied to e.g. materials for buildings.

What is claimed is:

1. A colored ceramic composition comprising, as inorganic components, from 5 to 40 wt % of a colored heat resistant pigment powder, from 60 to 95 wt % of a powder of zinc-containing glass and from 0 to 10 wt % of a refractory filler powder, wherein said glass consists essentially of the following components:

| $SiO_2$ | 30 to 60 wt % |
|---|---|
| ZnO | 8 to 60 wt % |
| $B_2O_3$ | 0 to 5 wt % |
| $Li_2O$ | 0 to 20 wt % |
| $Na_2O$ | 0 to 20 wt % |
| $K_2O$ | 0 to 20 wt % |
| $Li_2O + Na_2O + K_2O$ | 0.1 to 20 wt % |
| $MgO + CaO + SrO + BaO$ | 0 to 20 wt % |
| $Bi_2O_3$ | 0 to 40 wt % |
| $TiO_2$ | 0 to 10 wt % |
| F | 0 to 5 wt %. |

2. The colored ceramic composition according to claim 1, wherein said glass contains from 0.1 to 10 wt % of $Li_2O$.

3. The colored ceramic composition according to claim 1, wherein the powder of said glass is the one subjected to heat treatment at a temperature of from 500° to 700° C. for 10 minutes to precipitate crystals.

4. The colored ceramic composition according to claim 3, wherein the crystals precipitated by the heat treatment is lithium zinc silicate.

5. The colored ceramic composition according to claim 1, wherein said glass has a glass transition temperature of at most 550° C.

6. The colored ceramic composition according to claim 1, wherein said glass has a glass transition temperature of at least 400° C.

7. The colored ceramic composition according to claim 1, wherein said glass has an average thermal expansion coefficient of from $65 \times 10^{-7}$° to $100 \times 10^{-7}$/°C. within a temperature range of from 50° to 350° C. after baking the powder of said glass.

8. The colored ceramic composition according to claim 1, wherein said glass has an average thermal expansion coefficient of from $70 \times 10^{-7}$° to $95 \times 10^{-7}$/°C. within a temperature range of from 50° to 350° C. after baking the powder of said glass.

9. A method for producing a glass plate having a colored ceramic layer, which comprises preparing a colored ceramic paste containing the colored ceramic composition as defined in claim 1, coating the colored ceramic paste on at least a part of the surface of the glass plate to form a layer of the colored ceramic paste, and then heating and baking the paste layer to form a colored ceramic layer on the surface of the glass plate.

10. A method for producing a glass plate having a colored ceramic layer, which comprises preparing a colored ceramic paste containing the colored ceramic composition as defined in claim 1, coating the colored ceramic paste on at least a part of the surface of the glass plate to form a layer of the colored ceramic paste, overcoating a silver paste on at least a part of the colored ceramic paste layer, and baking the layers to form a colored ceramic layer and a silver layer on the surface of the glass plate.

* * * * *